United States Patent
Etchegoyen

(10) Patent No.: US 9,414,199 B2
(45) Date of Patent: Aug. 9, 2016

(54) PREDICTIVE DELIVERY OF INFORMATION BASED ON DEVICE HISTORY

(71) Applicant: Uniloc Luxembourg S.A., Luxembourg (LU)

(72) Inventor: Craig S. Etchegoyen, Plano, TX (US)

(73) Assignee: Uniloc Luxembourg S.A., Luxembourg (LU)

(*) Notice: Subject to any disclaimer, the term of this patent is extended or adjusted under 35 U.S.C. 154(b) by 135 days.

(21) Appl. No.: 14/188,063

(22) Filed: Feb. 24, 2014

(65) Prior Publication Data

US 2014/0258471 A1    Sep. 11, 2014

Related U.S. Application Data

(60) Provisional application No. 61/774,305, filed on Mar. 7, 2013.

(30) Foreign Application Priority Data

Jun. 7, 2013    (AU) .................................. 2013100804

(51) Int. Cl.
*H04W 4/02*    (2009.01)
*H04W 4/14*    (2009.01)
*H04W 4/20*    (2009.01)

(52) U.S. Cl.
CPC ................ *H04W 4/028* (2013.01); *H04W 4/14* (2013.01); *H04W 4/206* (2013.01)

(58) Field of Classification Search
USPC ........................... 709/204, 217, 219, 223, 224
See application file for complete search history.

(56) References Cited

U.S. PATENT DOCUMENTS

| | | | |
|---|---|---|---|
| 6,151,631 A | 11/2000 | Ansell et al. | |
| 7,057,556 B2 | 6/2006 | Hall et al. | |
| 7,091,851 B2 | 8/2006 | Mason et al. | |
| 7,826,409 B2 | 11/2010 | Mock et al. | |
| 8,320,938 B2 | 11/2012 | Meyer et al. | |
| 8,606,220 B2 | 12/2013 | Soliman et al. | |
| 2003/0046022 A1 | 3/2003 | Silverman | |
| 2003/0134648 A1 | 7/2003 | Reed et al. | |
| 2003/0176196 A1 | 9/2003 | Hall et al. | |
| 2003/0222820 A1 | 12/2003 | Karr et al. | |
| 2004/0002346 A1 | 1/2004 | Santhoff | |
| 2004/0198392 A1 | 10/2004 | Harvey et al. | |
| 2005/0070306 A1 | 3/2005 | Kim et al. | |
| 2005/0249175 A1* | 11/2005 | Nasu et al. ................ 370/338 |

(Continued)

FOREIGN PATENT DOCUMENTS

| EP | 1 739 879 A1 | 1/2007 |
|---|---|---|
| EP | 2 096 597 A2 | 9/2009 |

(Continued)

*Primary Examiner* — Viet Vu
(74) *Attorney, Agent, or Firm* — Sean D. Burdick

(57) ABSTRACT

A server sends information to user devices based on not only the current location of those devices but also predicted future locations of those devices. A number of actions are associated with one or more predetermined locations, a predetermined maximum amount of time, and a predetermined minimum likelihood. When the server determines that a given user device is likely to be in one of the predetermined locations within the predetermined maximum amount of time with at least the predetermined minimum likelihood, the server performs the associated acts with respect to the user device. An example of such an action is sending a promotion or advertisement to the user device, e.g., as an SMS message.

5 Claims, 6 Drawing Sheets

(56) References Cited

U.S. PATENT DOCUMENTS

| | | |
|---|---|---|
| 2006/0270421 A1 | 11/2006 | Phillips et al. |
| 2007/0197229 A1 | 8/2007 | Kalliola et al. |
| 2007/0270164 A1 | 11/2007 | Maier et al. |
| 2008/0085727 A1 | 4/2008 | Kratz |
| 2008/0102957 A1 | 5/2008 | Burman et al. |
| 2008/0155094 A1 | 6/2008 | Roese et al. |
| 2008/0167896 A1 | 7/2008 | Fast et al. |
| 2008/0233956 A1 | 9/2008 | Wyk et al. |
| 2009/0319177 A1* | 12/2009 | Khosravy et al. ............ 701/207 |
| 2010/0087166 A1 | 4/2010 | Agashe |
| 2011/0010245 A1* | 1/2011 | Priebatsch et al. ......... 705/14.58 |
| 2011/0196711 A1 | 8/2011 | Craig et al. |
| 2012/0271884 A1* | 10/2012 | Holmes et al. ................ 709/204 |
| 2013/0036165 A1* | 2/2013 | Tseng et al. .................. 709/204 |

FOREIGN PATENT DOCUMENTS

| | | |
|---|---|---|
| EP | 2 182 752 | 5/2010 |
| EP | 2 287 820 | 2/2011 |
| WO | WO 2008/055865 | 5/2008 |

* cited by examiner

PREDICTIVE DELIVERY OF INFORMATION BASED ON DEVICE HISTORY

This application claims priority to U.S. Provisional Application 61/774,305, filed Mar. 7, 2013, which is fully incorporated herein by reference.

BACKGROUND OF THE INVENTION

1. Field of the Invention

The present invention relates generally to computer data processing and, more particularly, methods of and systems for delivery of information to a device based on the location history of the device.

2. Description of the Related Art

Location-based services have been recognized as important and valuable for years. Typically, providers of location-based services arrange to have information regarding services delivered to device when the device is determined to be near a given location. However, the current location of a device provides very limited information about the device and therefore limits how relevant any location-based information sent to the device can be.

What is needed is a way to provide information to a device where the information is selected based on more than just the current location of the device.

SUMMARY OF THE INVENTION

In accordance with the present invention, a server sends information to user devices based on not only the current location of those devices but also predicted future locations of those devices. Over time, server gathers location information from the user devices to collect locations histories of the devices and uses the location histories to periodically predict future locations of the devices.

A number of actions are associated with one or more predetermined locations, a predetermined maximum amount of time, and a predetermined minimum likelihood. When the server determines that a given user device is likely to be in one of the predetermined locations within the predetermined maximum amount of time with at least the predetermined minimum likelihood, the server performs the associated acts with respect to the user device. An example of such an action is sending a promotion or advertisement to the user device, e.g., as an SMS message.

To make a prediction regarding future locations of the user device, the server considers the user device's location history in a current context. One part of the current context is the current day and the current time. To appreciate this context, it is helpful to consider an example. Consider that a new department store has opened at a given location. The manager of the department store can request that anyone that is at least 50% likely to visit a store considered to be in competition of the department store within one hour should be sent a promotional code entitling that person to a discount. To do so, the manager can specify locations of all competing stores within a five-mile radius of the given location as the one or more predetermined locations. In addition, the manager can specify 50% as the predetermined minimum likelihood and one hour as the predetermined maximum amount of time. The manager can also specify days and times at which the actions are applicable, e.g., only during hours at which the new department store is open.

Another part of the current context is the current location of the user device. Continuing in the example above, consider that a given user device has a history of shopping at the department store to get excellent customer service in learning about new products and then immediately going to a discount store to buy the new products at a lower price—the classic free rider problem. The presence of the user device in the department store can indicate that the user device will soon be heading to a competitor of the department store. Recognizing this, the server can deliver a promotional code to the user device, encouraging the user of the user device to buy the product in the department store rather than at the competitor.

In addition, if the manager of the department store sets up different actions for locations of competitors of a given type of store, the promotional code can be for a particular type of goods. Consider that all competitors selling electronics products are the predetermined locations. The action can be sending a promotional code for a discount on electronic products to the user device.

The current context can also be a combination of the current day and time and the current location of the user device. Continuing in the above example, consider that the department store includes a restaurant that does brisk business in the evenings but is nearly empty at lunch time on weekdays despite a flourishing business neighborhood in which many workers typically eat lunch at restaurants. The same manager can specify other nearby restaurants as the predetermined locations but limit the applicability of those locations to week days from 11:30 am to 2:00 pm, for example.

Unlike conventional location-based services in which information is presented to a user device based on its current location only, the information presented to a user device in the manner described herein can actually influence the future location of the user device by offering an alternative trip the user can take rather than the trip typically taken in the current context.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, a server 106 (FIG. 1) sends information to user devices 102A-D based on not only the current location of those devices but also predicted future locations of those devices. Over time, server 106 gathers location information from user devices 102A-D and uses the gathered location information to periodically predict future locations of the devices.

User devices 102A-D (FIG. 1) each can be any of a number of types of networked computing devices, including smartphones, tablets, netbooks, laptop computers, and desktops computers, though location information is expected to be more useful for devices that are portable. Each of user devices 102A-D serves as a location proxy for a single user. In other words, the location of each of user devices 102A-D is presumed to be the location of a single user. In addition, each of user devices 102A-D communicates with server 106 through a network 108, which is the Internet in this illustrative embodiment. Network 108 can also be a mobile telephony network. User devices 102A-D are analogous to one another and description of user device 102A is equally applicable to user devices 102B-D unless otherwise noted herein. It should also be noted that, while four (4) user devices are shown in this illustrative example, more or fewer than four (4) user devices can report locations for receiving future-location-based information in the manner described herein.

Figure 2:
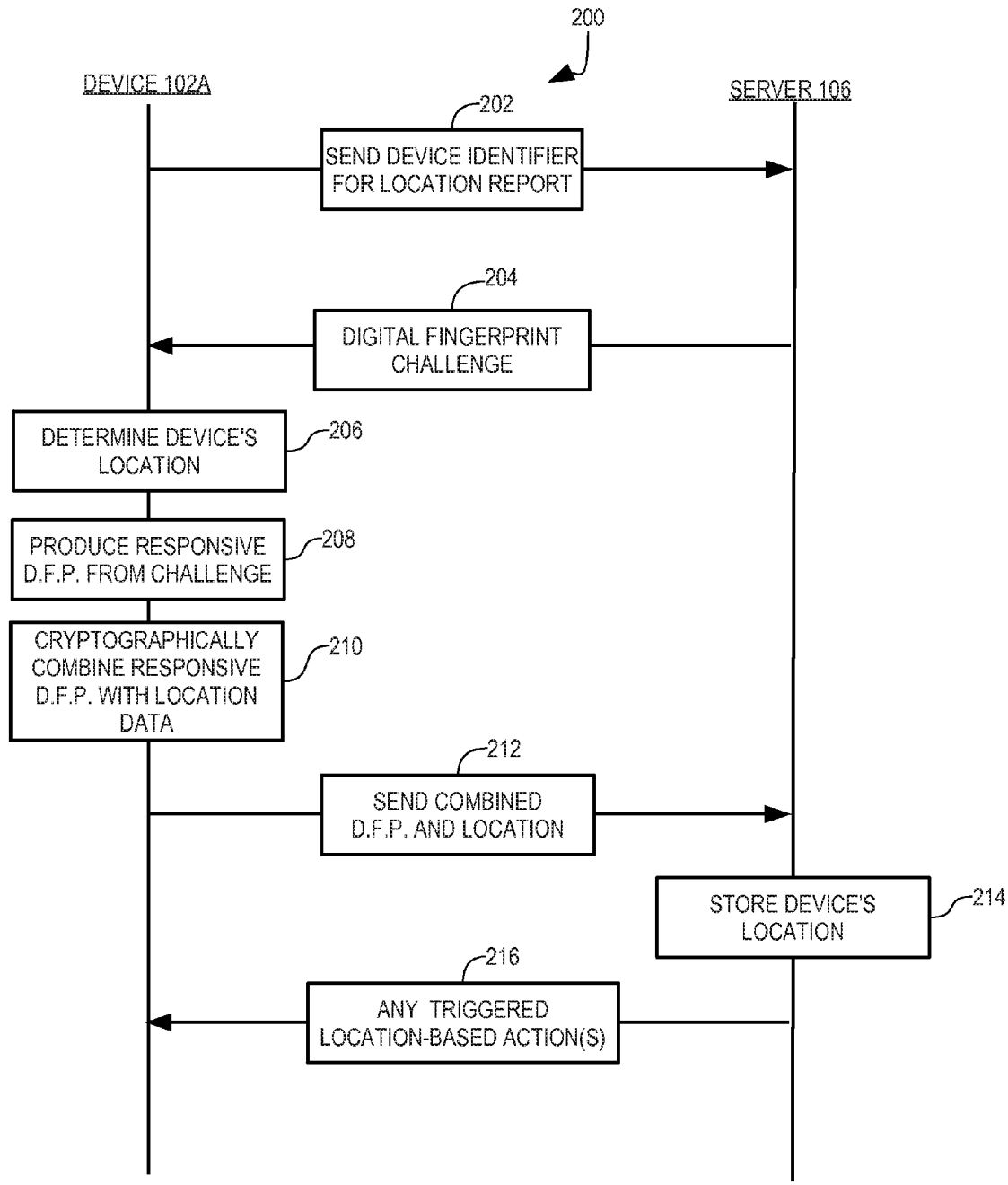
FIG. 2 is a transaction flow diagram showing reporting of current location by a mobile device of FIG. 1.

Transaction flow diagram 200 (FIG. 2) illustrates the reporting by user device 102A of its location to server 106.

In step 202, user device 102A sends its globally unique device identifier to server 106 along with data indicating an intent to report the current location of user device 102A.

In step 204, server 106 sends a digital fingerprint challenge to user device 102A. Digital fingerprints and digital fingerprint challenges are known and described in U.S. Patent Application Publication 2011/0093503 for "Computer Hardware Identity Tracking Using Characteristic Parameter-Derived Data" by Craig S. Etchegoyen (filed Apr. 21, 2011) and that description is incorporated herein in its entirety by reference.

Digital fingerprints offer the advantage of being more stable and less amenable to spoofing that are IP addresses and MAC addresses and, of particular significance here, require no user intervention. Accordingly, location reporting in transaction flow diagram 200 is secure, reliable (no device spoofing), and requires no action on the part of the user.

To avoid frequent communication of digital fingerprints through network 108, device identification and authentication uses only part of the digital fingerprints of user devices 102A-D. A digital fingerprint challenge specifies one or more parts of a digital fingerprint and a manner in which the parts are combined and cryptographically obscured. In addition, the digital fingerprint challenge can change each time device identification and authentication is needed. Accordingly, each time a given device sends its digital fingerprint in response to a different digital fingerprint challenge, the digital fingerprint sent is different. Any digital fingerprint intercepted within network 108 or any network will not authenticate properly if used in response to a different digital fingerprint challenge.

In step 206, user device 102A determines its geographic location. The manner in which user device 102A determines its geographical location is described in U.S. Application 61/746,719, which was filed Dec. 31, 2012, and which is fully incorporated herein by reference.

Figure 8:
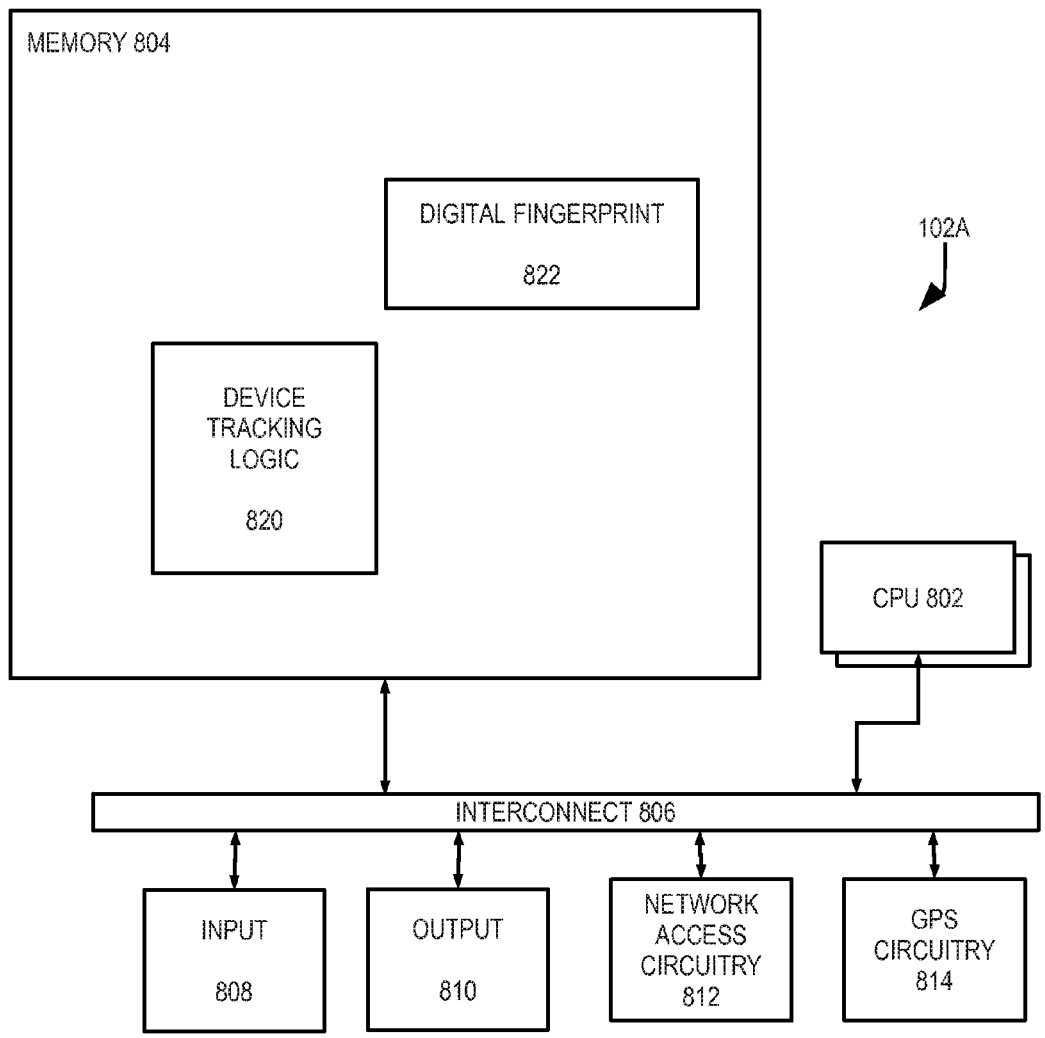
FIG. 8 is a block diagram showing a mobile device of FIG. 1 in greater detail.

In step 208, user device 102A produces a responsive digital fingerprint data using the challenge received in step 204 and digital fingerprint 822 (FIG. 8).

In step 210 (FIG. 2), user device 102A cryptographically combines the responsive digital fingerprint data produced in step 208 with data representing the location of user device 102A determined in step 208. By cryptographically combining the responsive digital fingerprint data and the location data, user device 102A makes the data tamper-evident and obscured.

Figure 9:
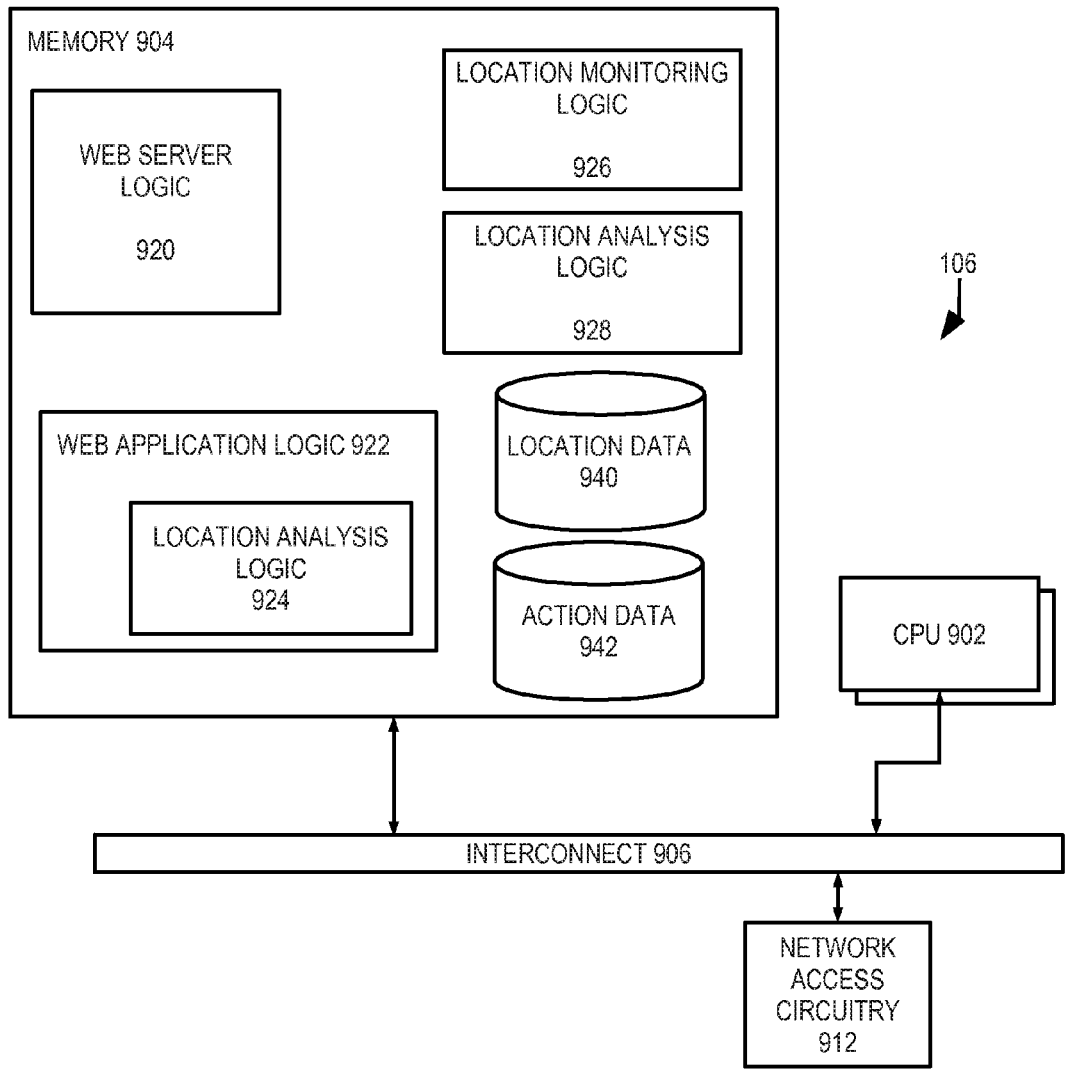
FIG. 9 is a block diagram showing the server of FIG. 1 in greater detail.

In step 212, user device 102A sends the combined data to server 106. In step 214, server 106 parses the responsive digital fingerprint data and location data and stores the location of user device 102A in location data 940 (FIG. 9).

Figure 3:
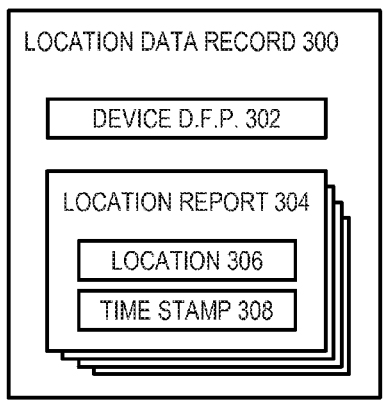
FIG. 3 is a block diagram of a location data record used by the server of FIG. 1 to represent a location report received from a mobile device.

Server 106 stores the location of user device 102A in a location data record 300 (FIG. 3). Device digital fingerprint 302 is the digital fingerprint by which user device 102A is identified and authenticated. A number of location reports 304 identify the location of user device 102A at a given date and time. Location 306 represents the location of user device 102A, and time stamp 308 represents the date and time.

In step 216 (FIG. 2), server 106 sends information specified in any location-based actions stored by server that are triggered by the location history of user device 102A. After step 216, processing according to transaction logic diagram 200 completes.

Figure 4:
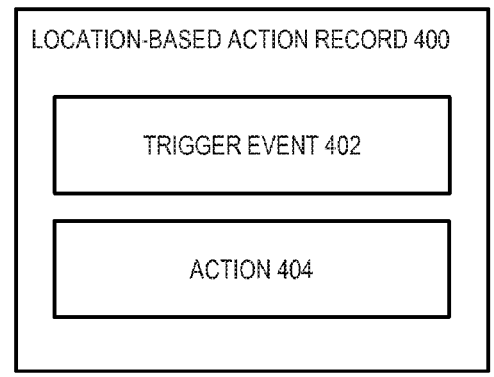
FIG. 4 is a block diagram of a location-based action record used by the server of FIG. 1 to take actions based on predicted future locations of mobile devices.

Location-based actions specify actions to be taken if user device 102A is predicted to be in any of a number of locations in the future within a predetermined amount of time by a predetermined threshold likelihood. An example of such a location-based action is represented by location-based action record 400 (FIG. 4). Location-based action record 400 includes a trigger event 402 that represents the conditions under which action is to take place and an action 404 that is to take place under the conditions represented by trigger event 402.

Figure 5:
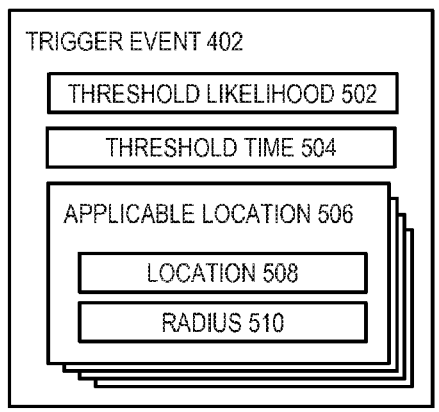
FIG. 5 is a block diagram of a trigger event of the location-based action record of FIG. 4 in greater detail.

Trigger event 402 is shown in greater detail in FIG. 5. In essence, trigger event 402 asks whether user device 102A is likely to be in any of a number of locations within a predetermined amount of time in the future. Threshold likelihood 502 specifies a predetermined threshold likelihood. Threshold time 504 specifies a predetermined threshold amount of time into the future. Each of a number of application locations 506 specifies the locations. In this illustrative embodiment, each applicable location 506 is specified by a location 508 (such as latitude and longitude, for example) and a radius 510. Thus, trigger event 402 specifies, as a condition for performance of action 404 (FIG. 4), that user device 102A must be determined to be at least as likely as threshold likelihood 502 (FIG. 5) to be at any of applicable locations 506 within an amount of time represented by threshold time 504.

Figure 6:
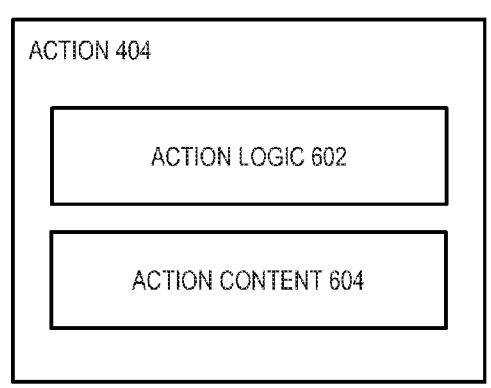
FIG. 6 is a block diagram of an action of the location-based action record of FIG. 4 in greater detail.

Action 404 (FIG. 4) is shown in greater detail in FIG. 6. Action logic 602 specifies the behavior of server 106 in performing action 404. For example, action logic 602 can cause server 106 to send an SMS or MMS message to user device 102A or to register user device 102A as one to receive a special discount if used to pay for a transaction at a merchant. Action content 604 specifies content to be used in performance of action logic 602, e.g., the content to send to user device 102A as a SMS or MMS message.

In some embodiments, location-based action record 400 can have multiple trigger events 402 combined with "AND" and/or "OR" relationships and/or multiple actions 404.

Figure 7:
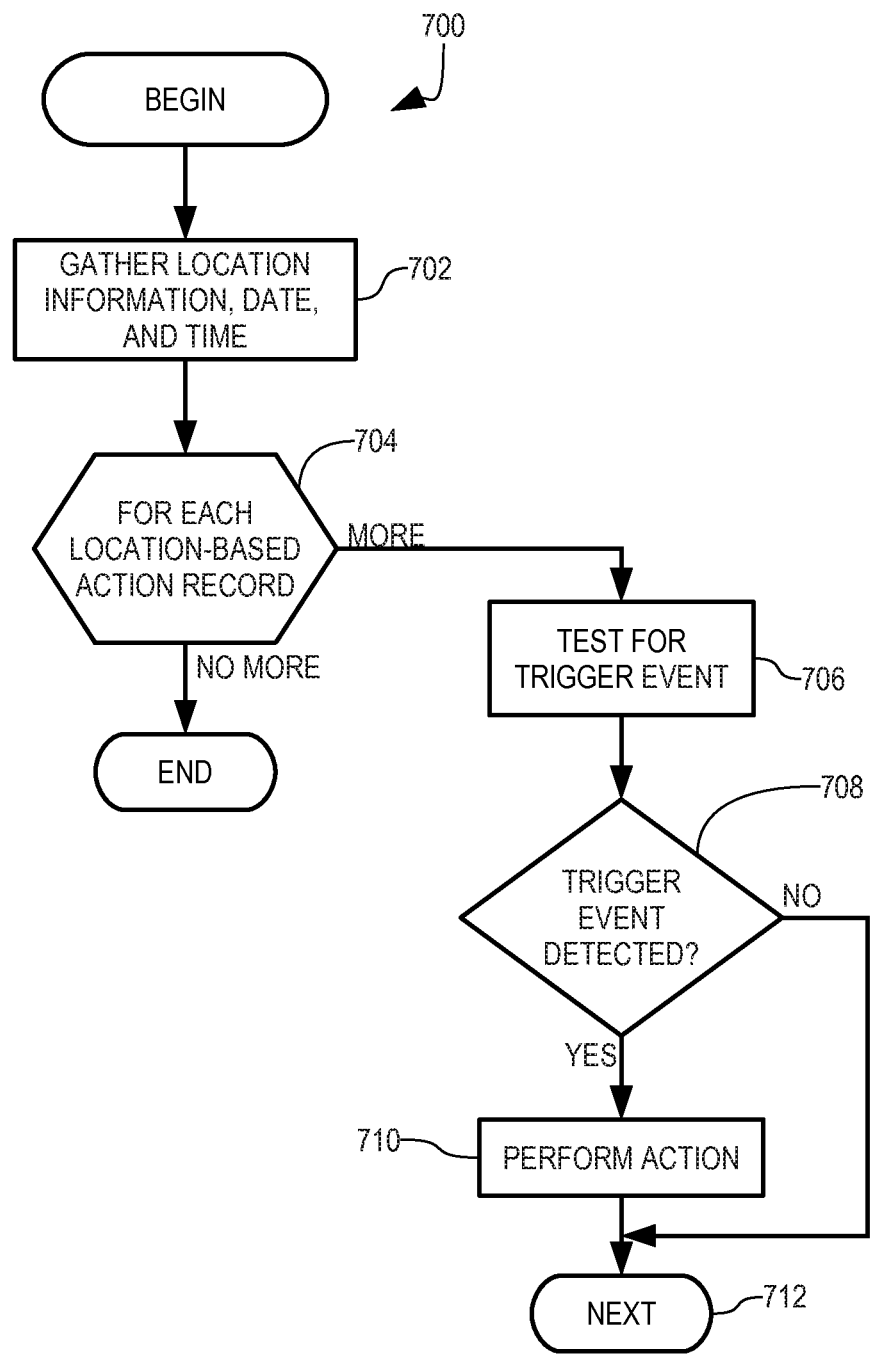
FIG. 7 is a logic flow diagram illustrating the manner in which the server of FIG. 1 processes location-based action records to take actions based on predicted future locations of mobile devices.

The manner in which server 106 processes location-based action records such as location-based action record 400 is illustrated by logic flow diagram 700 (FIG. 7). In step 702, server 106 gathers the current location of user device 102A and the current date and time.

Loop step 704 and next step 712 define a loop in which server 106 processes each of a number of location-based action records according to steps 706-710. During each iteration of the loop of steps 704-712, the particular location-based action record processed by server 106 is sometimes referred to as "the subject location-based action record."

In step 706, server 106 determines whether the subject location-based action record is currently triggered. There are generally two (2) predictive patterns checked by server 106 in determining the likelihood of user device 102A to be in a particular place at a particular time. The first is by analyzing the location data record 300 (FIG. 3) for user device 102A for location patterns associated with times of day, days of the week, days of the month, and days of the year. For example, the user of user device 102A might have lunch at the same place at least three (3) days each work week—typically at about 12:30 pm. If the current time is 12:00 pm and it is currently a work week day, server 106 can determine that the likelihood of user device 102A going to that same place within the next hour to be three in five, or 60%. Server 106 can also take into account other information such as whether user device 102A has not gone to that same place in the previous two (2) days of the current work week.

The second is by analyzing the location data record 300 (FIG. 3) for user device 102A for location patterns associated with other locations of user device 102A. In other words, server 106 tries to answer the question, "Given that user device 102A is at its current location, what are the odds that user device 102A will be in another given location within the predetermined amount of time according to the location history of user device 102A?" For example, a user may have the tendency to shop in a large department store to get help from sales clerks and then go around the corner to a discount shop to buy merchandise at a great discount. The presence of user device 102A in the large department store can indicate that user device 102A is likely to be in the discount shop in the near future.

Server 106 can identify such a tendency by identifying each location report 304 (FIG. 3) representing a location of user device 102A within a predetermined distance of its current location and determining how many of those location reports 304 are followed within the predetermined amount of time of threshold time 504 (FIG. 5) of a location report 304 (FIG. 3) of user device 102A at one or more of applicable locations 506 (FIG. 5).

Server 106 can also combine the current time and the current location of user device 102A in testing trigger event 402. For example, server 106 can consider only location reports 304 (FIG. 3) that are near the current location of user device 102A and that have time stamps 308 that are between the current time and the future time represented by threshold time 504 (FIG. 5) for relevant days of the week, month, year, etc. Considering only those location reports 304 (FIG. 3), server 106 can determine how frequently user device 102A visits an applicable location 506 after being at its current location.

It is helpful to consider the example of a trigger event 402 (FIG. 5) in which threshold likelihood 502 represents 70%, threshold time 504 represents one hour, and applicable locations 506 represent various locations of a retail business. This trigger can be satisfied (i) if user device 102A goes to the retail business in a predictable pattern, such as every Friday evening at around 6:30 pm and it's currently 5:45 pm, of (ii) if user device 102A typically visits a competitor retail business before visiting the subject retail business and user device 102A is currently at the competitor retail business.

In test step 708 (FIG. 7), server 106 determines whether the trigger event of the subject location-based action record is satisfied. If so, processing transfers to step 710 in which server 106 performs the action of the subject location-based action record. If not, server 106 skips step 710.

After steps 708-710, processing by server 106 transfers through next step 712 to loop step 704 and server 106 processes the next location-based action record according to the loop of steps 704-712. When all location-based action records have been processed according to the loop of steps 704-712, processing according to logic flow diagram 700 completes.

In one embodiment, user device 102A is configured to report its location according to transaction logic diagram 200 at regular time intervals. In an alternative embodiment, user device 102A is configured to report its location according to transaction logic diagram 200 in response to a number of triggering events, including for example, determination of the location of user device 102A for reasons independent of reporting of the location to server 106 and connecting to a wireless networking access point. Thus, any time the user of user device 102A uses GPS circuitry of user device 102A resulting in determination of the location of user device 102A, user device 102A reports the location to server 106 in the manner described above.

User device 102A is a personal computing device and is shown in greater detail in FIG. 8. User device 102A includes one or more microprocessors 802 (collectively referred to as CPU 802) that retrieve data and/or instructions from memory 804 and execute retrieved instructions in a conventional manner. Memory 804 can include generally any computer-readable medium including, for example, persistent memory such as magnetic and/or optical disks, ROM, and PROM and volatile memory such as RAM.

Figure 1:
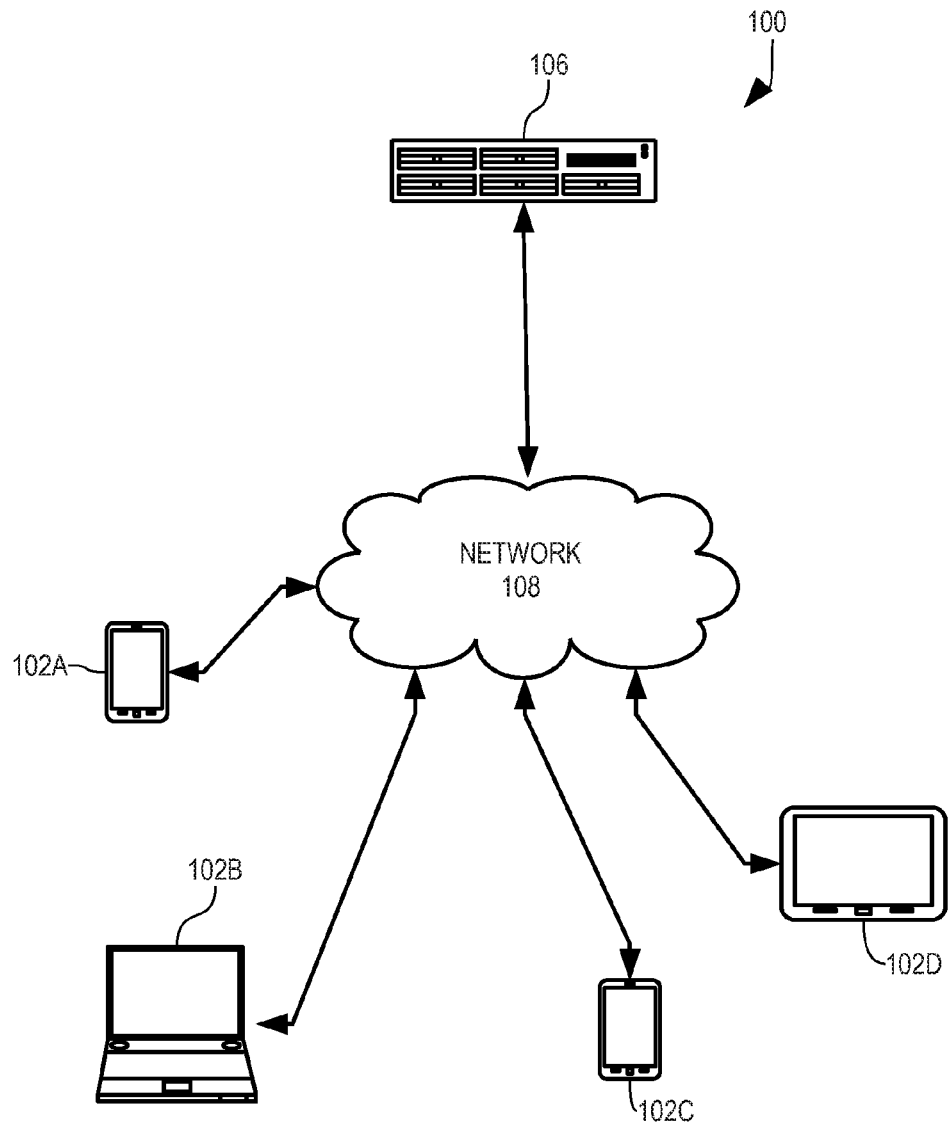
FIG. 1 is a diagram showing a server computer that gathers and analyzes location data from a number of mobile devices through a computer network to send information to a user device based on predicted future locations in accordance with one embodiment of the present invention.

CPU 802 and memory 804 are connected to one another through a conventional interconnect 806, which is a bus in this illustrative embodiment and which connects CPU 802 and memory 804 to one or more input devices 808, output devices 810, and network access circuitry 812. Input devices 808 can include, for example, a keyboard, a keypad, a touch-sensitive screen, a mouse, a microphone, and one or more cameras. Output devices 310 can include, for example, a display—such as a liquid crystal display (LCD)—and one or more loudspeakers. Network access circuitry 812 sends and receives data through computer networks such as network 108 (FIG. 1). GPS circuitry 814 determines the location of user device 102A in a conventional manner.

A number of components of user device 102A are stored in memory 804. In particular, device tracking logic 820 is all or part of one or more computer processes executing within CPU 802 from memory 804 in this illustrative embodiment but can also be implemented using digital logic circuitry. As used herein, "logic" refers to (i) logic implemented as computer instructions and/or data within one or more computer processes and/or (ii) logic implemented in electronic circuitry. Device tracking logic 820 causes user device 102A to report its location in the manner described above.

Digital fingerprint 822 is persistent data stored in memory 804.

Server 106 is a computing device and is shown in greater detail in FIG. 9. Server 106 includes one or more microprocessors 902 (collectively referred to as CPU 902), memory 904, an interconnect 906, and network access circuitry 912 that are analogous to CPU 802 (FIG. 8), memory 804, interconnect 806, and network access circuitry 812, respectively.

A number of components of server 106 are stored in memory 904. In particular, web server logic 920 and web application logic 922, including location analysis logic 924, are each all or part of one or more computer processes executing within CPU 902 from memory 904 in this illustrative embodiment but can also be implemented using digital logic circuitry. Location monitoring logic 926 and location analysis logic 928 are also each all or part of one or more computer processes executing within CPU 902 from memory 904 in this illustrative embodiment but can also be implemented using digital logic circuitry.

Web server logic 920 is a conventional web server. Web application logic 922 is content that defines one or more pages of a web site and is served by web server logic 920 to user devices such as user device 102A. Location analysis logic 924 specifies the behavior of server 106 in providing location analysis services in the manner described above. For example, location analysis logic 924 determines the likelihood that user device 102A will be in a particular location within a predetermined amount of time. In addition, location analysis logic 924 analyzes location data 940, invoking location analysis logic 928 in some embodiments.

Location monitoring logic 926 specifies the behavior of server 106 in receiving location reports in the manner described above and in the UN-003 Application. Location analysis logic 928 specifies the behavior of server 106 in analyzing location data 940 in the manner described herein and in the UN-003 Application.

Location data 940 and action data 942 are each data persistently stored in memory 904 and are each organized as one or more databases in this illustrative embodiment. Location data 940 includes location data records such as location data record 300 (FIG. 3). Action data 942 includes location-based action records such as location-based action record 400 (FIG. 4).

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for delivering information to two or more user devices, the method comprising:
    retrieving the information from one or more data records that associate the information with one or more predetermined locations, a predetermined maximum amount of time, a predetermined likelihood, and one or more predetermined actions; and
    for each of the two or more user devices:
    predicting whether the user device will be at any of the one or more predetermined locations within the predetermined maximum amount of time with at least the predetermined likelihood; and
    in response to the predicting that the user device will be at any of the one or more predetermined locations within the predetermined maximum amount of time with at least the predetermined likelihood, performing the one or more predetermined actions;
    wherein at least one of the actions includes delivering the information to the user device.

2. The method of claim 1 wherein predicting comprises:
    analyzing a location history of the user device.

3. The method of claim 1 wherein predicting comprises:
    analyzing a location history of the user device for day- and time-based patterns related to a current time and a current day.

4. The method of claim 1 wherein predicting comprises:
    analyzing a location history of the user device for movement patterns related to a current location of the user device.

5. The method of claim 1 further comprising:
    analyzing a location history of the user device for patterns that involve day- and time-based and movement related to a current time, a current day, and a current location of the user device.

* * * * *